United States Patent [19]

Farmer

[11] Patent Number: 4,626,330
[45] Date of Patent: Dec. 2, 1986

[54] TORSIONALLY INSTALLED ANODE AND EARTH ANCHOR/PENETRATOR

[75] Inventor: Marion R. Farmer, Shelby County, Tenn.

[73] Assignee: Dixie Electrical Manufacturing Company, Memphis, Tenn.

[21] Appl. No.: 781,675

[22] Filed: Sep. 30, 1985

Related U.S. Application Data

[63] Continuation of Ser. No. 573,845, Jan. 25, 1984, abandoned.

[51] Int. Cl.$^4$ ............................................. C23F 13/00
[52] U.S. Cl. .................................. 204/197; 204/280; 204/289; 174/7
[58] Field of Search ............... 204/147, 148, 196, 197, 204/280, 289; 174/7

[56] References Cited

U.S. PATENT DOCUMENTS

| | | | |
|---|---|---|---|
| 501,811 | 7/1893 | Stombaugh | 174/7 |
| 2,053,214 | 9/1936 | Brown | 174/7 |
| 2,157,180 | 5/1939 | Little | 174/7 |
| 2,537,463 | 1/1951 | Hocher et al. | 174/7 |
| 2,763,907 | 9/1956 | Douglas | 204/197 |
| 3,383,297 | 5/1968 | Eberilis | 204/197 |
| 3,391,072 | 7/1968 | Pearson | 204/197 |
| 3,516,917 | 6/1970 | Maurin | 204/196 |
| 3,522,359 | 7/1970 | Marshall | 174/7 |
| 3,553,094 | 1/1971 | Scott et al. | 204/197 |
| 3,716,649 | 2/1973 | Smith et al. | 174/7 |
| 3,769,190 | 10/1973 | Deem | 204/197 |
| 3,817,852 | 6/1974 | Toedtman et al. | 174/7 |
| 3,876,819 | 4/1975 | Boyd et al. | 174/7 |
| 3,992,272 | 11/1976 | Maxson et al. | 204/197 |
| 3,994,794 | 11/1976 | Bohne | 204/197 |
| 4,038,168 | 7/1977 | Highuchi et al. | 204/197 |
| 4,176,033 | 11/1979 | Council | 204/197 |
| 4,316,050 | 2/1982 | Bergmark | 174/7 |

FOREIGN PATENT DOCUMENTS

| | | | |
|---|---|---|---|
| 579930 | 7/1958 | Italy | 174/7 |
| 265389 | 2/1927 | United Kingdom | 174/7 |

OTHER PUBLICATIONS

Kaiser Chemicals, "Sealloy-150 Aluminum Bracelet Anodes for Offshore Oil & Gas Pipelines", pp. 1–3, Nov., 1982.

Primary Examiner—T. Tung
Attorney, Agent, or Firm—Paul M. Denk

[57] ABSTRACT

A torsionally installed anode for galvanic corrosion protection and a combination torsionally installed anode and earth penetrator is disclosed. The anode may be screwed (i.e., torsionally installed) into the earth (e.g., the seabed, the riverbed, or the ground) so as to constitute a sacrificial anode. The anode may serve the dual purpose of protecting an underwater metallic article (e.g., a pipeline or the like) from corrosion, and of supporting the metallic article above the seabed.

10 Claims, 16 Drawing Figures

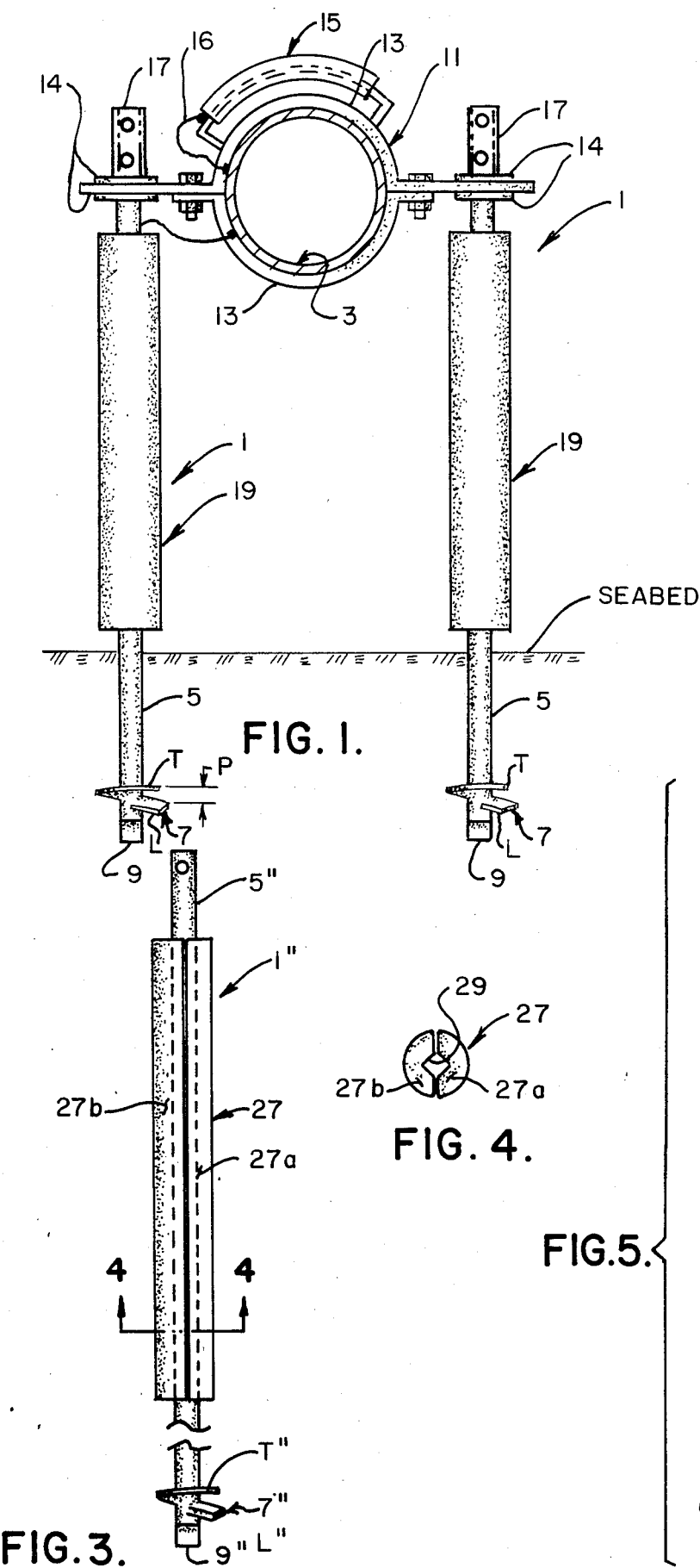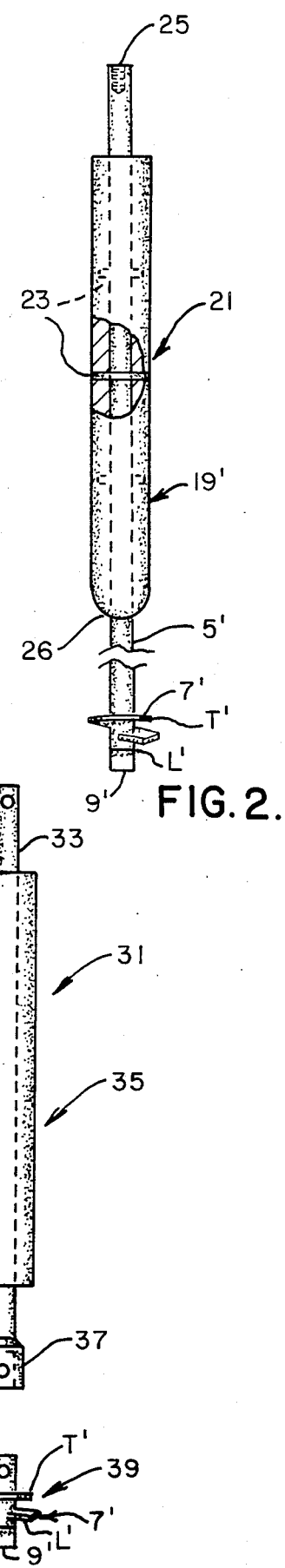

TORSIONALLY INSTALLED ANODE AND EARTH ANCHOR/PENETRATOR

This is a continuation of application having Ser. No. 573,845 now abandoned, filed on Jan. 25, 1984.

BACKGROUND OF THE INVENTION

This invention relates to a torsionally installed sacrificial anode for galvanic corrosion protection of a metallic article (e.g., an underground pipeline, steel piling, underground residential electrical distribution equipment, etc.) from corrosion and, in other embodiments thereof, relates to a torsionally installed combination galvanic anode and earth anchor/penetrator for not only providing galvanic corrosion protection to an underwater metal object (e.g., an undersea pipeline), but also serves to mount the metal object above the seabed.

Generally, corrosion of metallic objects, such as underground and undersea pipelines, underground residential electrical distribution lines and equipment, underground steel tanks, bridge pilings, deep well casings, piling anchors for seawalls, and offshore structures, results when the base metal (usually steel) of the article comes into contact with an electrolyte solution (i.e., ground water or sea water) which contains positively charged hydrogen ions ($H^{30}$) and negatively charged hydroxyl ions ($OH^-$). When the following four conditions are met, a metallic object will corrode: 1. the presence of an anode and a cathode; 2. an electrical potential between the anode and the cathode; 3. a metallic (or electrical) path between the anode and the cathode; and 4. the anode and the cathode must be immersed in the electrolyte solution. When these conditions are met, an electrical current will flow and the metallic anode will be consumed. Of course, if the anode is a steel structural member, such as a pipeline or a part of the superstructure of an offshore oil well platform or bridge, serious structural damage may occur.

When the above-mentioned four conditions are met, an electric current will flow from the anode to the cathode and the base metal (e.g., the steel) will be consumed where the current leaves the base metal to enter the surrounding electrolyte. Typically, the current generated is small (usually measured in milliamps). However, even a very small current restricted to localized discharge points can cause severe deterioration to steel pipes and the like. Usually, however, the discharge surface of the base metal is spread out over a large area, thus slowing down the rate of corrosion, but corrosion nevertheless results along the entire length of the metallic structure exposed to the electrolyte. The electrical resistance of the anode-cathode electrolyte circuit and the formation (or the lack thereof) of polarization films on the magnetic article controls, to a large degree, the rate of corrosion. Thus, coating systems have long been employed in many applications to reduce the rate of corrosion, but such coatings are not suitable for overcoming all galvanic corrosion problems.

Another common type of corrosion protection system is referred to as cathodic protection utilizing galvanic, sacrificial anodes. By transforming the protected metal structure from an anode to a cathode, corrosion of the metal structure can be inhibited. In one instance, if steel is the base metal, an anode having a higher reduction or electromotive potential voltage, such as zinc, aluminum, or magnesium, is electrically connected to the steel base metal, the galvanic current flowing through the base metal will use the higher reduction potential or electromotive voltage potential metal as the anode which, over time, will be sacrificially destroyed so as to prevent corrosion to the base metal. In certain instances, a voltage is impressed on the base metal so as to ensure that the base metal remains the cathode with this impressed voltage overcoming a variety of factors, such as dissimilar soil conditions, dissimilar base metals, coatings, electrolyte differences, etc., which affect the anode/cathode current. Reference may be made to such prior U.S. Pat. Nos. as 2,053,214 and 3,548,643, which disclose such impressed voltage cathodic corrosion protection systems.

These sacrificial anodes are commercially available in a variety of configurations, depending on the particular application. For example, in an underground onshore pipeline application, the anodes may be located remotely from the pipeline a distance of several yards and connected thereto by electrical lead wires with the anodes being buried in the earth along with the pipeline. As these underground anodes are sacrificially consumed, it is necessary, usually over extended periods of time, to replace the anodes as they are consumed. This initial installation and periodic replacement of underground sacrificial anodes oftentimes requires substantial excavation and backfilling which, of course, requires considerable manpower and equipment.

On underwater or submerged structures, such as the frameworks of offshore oil well platforms, bridge piers, and undersea pipelines, the anodes are typically mounted on the metallic base structure at strategic locations by means of steel straps or the like imbedded in the aluminum or magnesium sacrificial anode, and the steel straps are welded to the steel structure so as to ensure good electrical continuity between the structure and the anode. In other applications, so-called standoff anodes are used in which the anodes are spaced about 4-6 inches (10-15 cm.) from the surface of the sealed structure by means of a standoff steel frame or the like which is welded to the structure.

In the installation of grounding wires and the like in, for example, electrical distribution systems, it is oftentimes desirable to provide a ground anode which provides a low electrical resistance to ground, but yet which has sufficient strength to be sucessfully driven into the earth. Reference may be made to the following list of prior U.S. patents for examples of various grounding rods or shoes in the same general field as at least one embodiment of the present invention: U.S. Pat. Nos. 642,169, 1,737,562, 2,157,180, 2,537,463, 3,522,359, 3,716,649, 3,817,852, 3,876,819, and 4,316,050. While the prior art grounding rods worked well for their intended purposes, they were somewhat difficult to install, as in many applications they required separate excavation and backfilling operations.

Because such sacrificial anodes require periodic replacement, there has been a long-standing need for an easily replaceable sacrificial anode, particularly where the anode is to be buried underground in remote areas (e.g., along a power line or pipeline in rural areas) or under the seabed.

SUMMARY OF THE INVENTION

Among the several objects and features of the present invention may be noted the provision of a sacrificial anode and/or combination anode and earth penetrator for supporting an underwater metal object, such as a pipeline or the like, above the bed of the ocean and for providing cathodic corrosion protection in which the anode may be readily torsionally driven (i.e., screwed) into the ground or the seabed, and in which the metal object is solidly supported above the seabed;

The provision of such an anode which when used in onshore applications eliminates complex excavation and backfilling required to initially install and to replace underground sacrificial anodes;

The provision of such an anode which may be readily torsionally driven to its desired depth in underground or undersea bed applications using conventional earth penetrator/anchor torsional drive apparatus;

The provision of such an anode which facilitates the replacement of previously consumed sacrificial anodes, or which permits the ready installation of additional anodes as soil and corrosion conditions may dictate;

The provision of such an anode which permits the ready addition of anode corrosion protection to already in-place underground and undersea structures; and The provision of such an anode which, in applications such as undersea support systems, replacing concrete piers or supports for the underwater metal objects supported thereby, and which simultaneously provide cathodic corrosion protection for the metal object.

Other objects of this invention will be in part apparent and in part pointed out hereinafter.

Briefly stated, a torsionally installed galvanic anode of the present invention is intended for corrosion protection of a metal structure. The anode comprises an elongate shaft having means on its bottom end for screwing the shaft into the ground upon rotation of the shaft. An anode body is carried by the shaft and an electrical conductor is provided between the anode and the metal structure. Further, means is provided on the shaft which is cooperable with the rotatable drive means for rotation of the shaft.

BRIEF DESCRIPTION OF THE DRAWINGS

FIG. 1 is an elevational view of a pair of torsionally installed combination anodes and structural supports and/or earth penetrating anchor holddowns of the present invention disposed on opposite sides of an undersea pipeline supporting the pipeline above the seabed and providing galvanic corrosion protection for the pipeline;

FIG. 2 is a side elevation of a torsionally installed anode with portions broken away;

FIG. 3 is a side elevation of another embodiment of the anode shown in FIG. 2;

FIG. 4 is a cross sectional view taken along the line 4—4 of FIG. 3;

FIG. 5 is an exploded view of a modification of the support shown in FIG. 2 wherein the support has a removable, rotationally driven earth penetrator or screw tip for permitting the ready torsional installation (i.e., screwing) of the anode into the ground;

FIG. 14 is a view illustrating the use of torsionally installed anodes of the present invention to provide cathodic corrosion protection to underground steel pilings and to concrete reinforcing wires utilized in a building foundation or the like;

Corresponding references characters indicate corresponding parts throughout the several views of the drawings.

DESCRIPTION OF THE PREFERRED EMBODIMENTS

Figure 7:
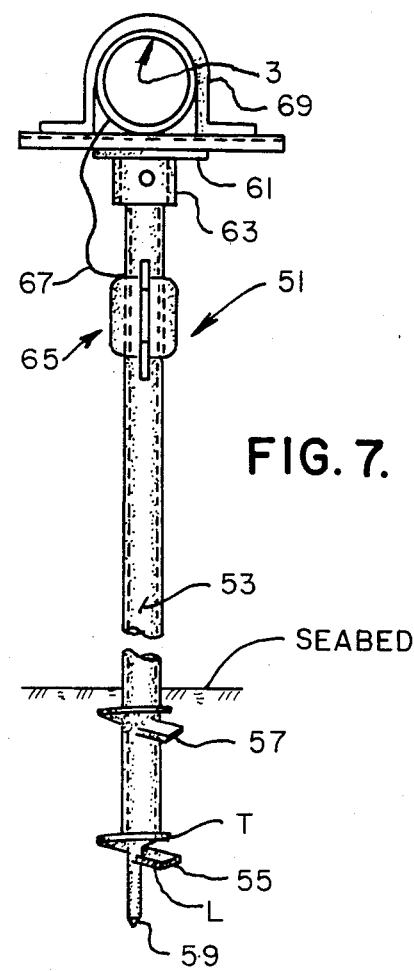
FIG. 7 is an elevational view of still another embodiment of a combination anode/support of the present invention.

Referring now to the drawings, and more particularly to FIG. 1, a pair of combination torsionally driven earth penetrator/cathodic corrosion resistant sacrificial anode assemblies is illustrated with each assembly being indicated in its entirety by reference character 1. In the applications shown in FIG. 1, an underwater pipeline, as generally indicated at 3, or other underwater metallic structure which is desired to be supported above the seabed and which is desired to have galvanic corrosion thereof inhibited, is supported by means of a pair of the torsionally driven earth penetrator or anchor/anode assemblies 1, one on either side of the pipeline. Alternately, the pipeline or structure 3 may be supported on a single anchor/anode assembly as shown in FIG. 7. Thus, the anode/earth anchor assemblies 1 of the present invention serve the dual purpose of securely mounting the underwater pipeline 3 (or other metallic underwater structure) above the seabed, and also provide corrosion protection for the pipeline.

Figure 11:
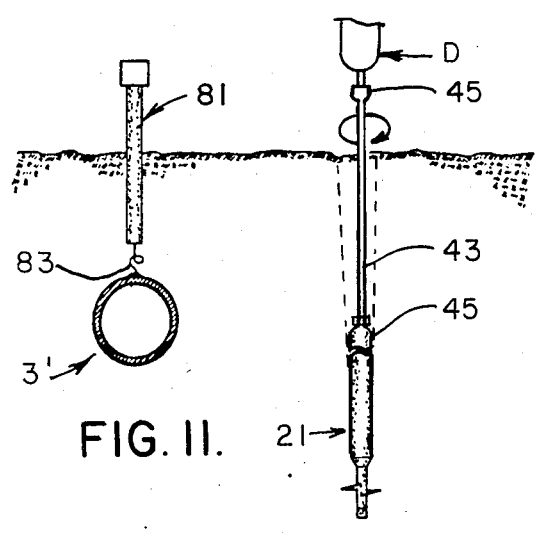
FIG. 11 is an end view of a pipeline with an anode of the present invention being torsionally driven into the ground proximate the onshore underground pipeline with the anodes electrically connected to the pipeline by suitable lead wires.

More specifically, the combination earth anchor/anode assembly 1 comprises an elongate anchor rod or shaft 5 extending axially of the assembly. Preferably, anchor rod 5 is of square cross section so that the anode body may be securely fastened thereto and so that a torsional drive tool D (or drive extension) having a female drive socket (as shown in FIG. 11) may be connected to the anode. However, within the broader aspects of this invention anchor rods of circular or other cross section may be used. A so-called torsional earth penetrating helix plate 7 is affixed (e.g., welded) adjacent the tip 9 of the anchor rod 5 so that the tip 9 and the helix plate 7 permit the ready torsional insertion (i.e., screwing) of the earth anchor/anode assembly into the seabed (or into the ground) thereby to rigidly mount the earth anchor/anode assembly with respect to the seabed or the ground. A support bracket, as generally indicated at 11, is carried by the upper ends of anchor rods 5. Support bracket 11 is shown to comprise a pair of collars 13 which are securely clamped around the outer circumference of pipeline 3 and which are supported by means of flanges 14 securely affixed to the upper end of anchor rods 5. In this manner, it will be appreciated that the pipeline 3 is solidly supported by anchor rods 5 above the level of the seabed at a desired location above the seabed. Further, an optional stand-off anode, as generally indicated at 15, may be provided on pipeline support bracket 11 for galvanic corrosion resistance protection of the pipeline support bracket or pipeline 3. This stand-off anode is shown to be in electrical contact with pipeline 3 and bracket 13 by means of a lead wire 16.

A torsional drive socket 17 may be rigidly affixed to the upper end of anchor rod 5 such that a conventional torsional earth anchor drive apparatus D having a male drive member (see FIG. 11) may be readily coupled to anchor rod 5 for torsionally driving or screwing tip 9 together with earth penetrating helix plate 7 into the seabed (or into the ground) upon rotation of shaft 5 in one direction (i.e., in clockwise direction as viewed looking down on helix plate 7 from above, as shown in FIG. 1). Optionally, female socket 17 may be omitted and a driving tool D having a female driving socket may be applied to the upper end of square shaft 5 to torsionally drive the assembly 1 into the seabed or into the ground. More specifically, helix plate 7 is of considerably larger diameter than shaft 5, and has a leading edge L and a trailing edge T. Generally, the helix plate has only about one flight or helical convolution between the leading and trailing edge, and the pitch P of the flight may be about 3.0–3.5 inches (7.6–8.9 cm.) so that upon each revolution of shaft 5, the helix plate and the shaft will penetrate or advance its way into the seabed or ground a distance approximately equal to the pitch P. Of course, it will be appreciated that the sharpened tip 9 effectively aids in torsionally driving the anode assembly into the seabed or the ground. Moreover, other types of earth auger screw thread arrangements may be utilized within the broader aspects of this invention. Also, the earth penetrating screw threads of the pair of supports 1 shown in FIG. 1 may be in opposite direction (i.e., one may have a left-hand thread while the other has a right-hand thread) thereby to counteract installation drive torques if both are simultaneously installed by a common torsional drive tool (not shown).

In accordance with this invention, shaft 5 is provided with a sacrificial anode 19 of a suitable metal or metal alloy having an electrical potential or electromotive force voltage potential above the electrical potential of the base metal of the metal object (e.g., pipeline 3) to be protected against galvanic corrosion. In most instances, the pipeline 3 or metallic object to be protected is made of steel which has an electromotive force voltage of about −0.44 volts. Therefore, a metal or metal alloy selected for sacrificial anode 19 must have an electromotive force voltage of greater magnitude than iron. Zinc, aluminum, or magnesium (or alloys thereof) have electromotive force voltages appreciably greater than iron, for example −0.76 volts, −1.66 volts, and −2.37 volts, respectively, and thus make suitable sacrificial anodes. Those skilled in the art will, however, recognize that metals and alloys other than zinc, aluminum, and magnesium may be utilized for anode 19 within the broader aspects of the present invention.

In FIG. 2, a torsionally driven underground anode assembly is illustrated in its entirety by reference character 21. This underground torsionally driven anode assembly is generally similar to the undersea combination earth anchor and anode assembly 1 illustrated in FIG. 1, except that it is particularly well suited for being torsionally driven or screwed well into the earth, completely below ground level, for cathodic corrosion protection of underground metallic structures, such as pipelines 3', underground electrical utility systems, and pilings, as best illustrated in FIGS. 11–14. The "primed" reference characters shown in FIG. 2 illustrate parts heretofore described in regard to earth anchor/anode assembly 1 having a substantially similar construction and function, and thus will not be described in detail.

Referring now to anode body 19' installed on underground anode assembly 21, this anode body is shown to be a cast-in-place anode body surrounding anchor rod 5. To aid in the mechanical interlocking of anode body 19' on shaft 5', and to aid in electrical continuity between the shaft and the anode body, a series of flanges and/or protrusions 23 are affixed (e.g., welded) at substantially equal intervals along the length of shaft 5' so that when the anode body 19' is cast-in-place on the shaft, it is cast around shaft 5' as well as around flanges 23. In this manner, anode body 19' is securely held in place so that as the underground anode assembly 21 is torsionally driven below the surface of the earth, as shown in FIGS. 11–14, the anode body will remain fixed in place with respect to anchor rod 5'. At the upper end of anchor rod 5', a tapped hole 25 is provided for attachment of a lead wire electrically interconnecting shaft 5' with the underground metallic object (e.g., pipeline 3). Moreover, the bottom end of anode body 19' may be radiused or tapered, as indicated at 26, so as to aid in penetration of the anode 21 into the ground to a desired depth. It will be understood that such cast-in-place anodes 19 may also be utilized on the combination earth anchor/anode assemblies 1.

Referring now to FIGS. 3 and 4, an alternative embodiment earth anchor/anode assembly 1 is illustrated and is indicated in its entirety by reference character 1". This other embodiment is essentially identical to the earth anchor/anode assembly shown in FIG. 1, except that the anode body, as generally indicated at 27, is comprised of two separately cast anode sections, as indicated at 27a, 27b which are adapted to be removably secured (e.g., bolted) in place around the square cross sectional shaft 5". Toward this end, an aperture 29 is formed between the anode body sections 27a, 27b (as shown in FIG. 4) for receiving anchor rod 5" and for gripping the sides of the anchor rod.

Referring now to FIG. 5, a so-called universal earth anchor/anode assembly is indicated in its entirety by reference character 31. Generally, this anchor/anode assembly is similar in construction to anchor/anode assembly 1 in that it comprises an elongate anchor rod 33 which has an anode body 35 cast-in-place on the rod. At the bottom end of rod 33, a socket 37 is provided which receives a removable seabed and/or earth penetrating screw tip, as generally indicated at 39. This removable seabed and/or earth penetrating tip comprises a shaft extension similar to tip 9', and has a helix plate 7' fixed thereto slightly above tip 9'. In this manner, the tip 39 may be attached directly to the universal earth anchor/anode assembly 31 or an extension shaft (not shown) may be interposed between socket 37 and the removable tip 39. The upper end of rod 33 may be of square cross section such that a torsional drive tool (not shown) may be applied, and/or additional anode extensions may be applied as needed. It will be understood that a series of assemblies 31 may be coupled together in end-to-end relation.

Figure 6:
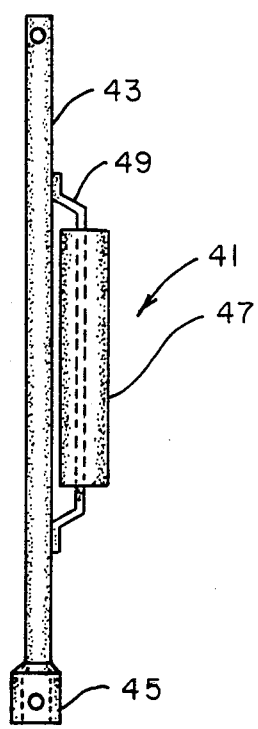
FIG. 6 is a side elevational view of still another embodiment of the anode/support of the present invention utilizing a stand-off anode.

In FIG. 6, a supplemental stand-off anode assembly is illustrated in its entirety by reference character 41. This supplemental stand-off anode assembly may be, for example, fitted into socket 37 of the universal anchor anode assembly and may have the removable tip 39 fitted thereto. More specifically, assembly 41 includes an elongate rod 43 of square cross section having a socket 45 on its lower end, this socket being essentially identical to socket 37 heretofore described. A so-called stand-off anode body 47 is cast-in-place around a stand-off strap 49 which in turn is welded to rod 43 so as to provide good electrical continuity between rod 43 and the anode body 47. Such supplemental stand-off anode bodies may be utilized in conjunction with the universal anchor/anode assemblies 31 if, for example, it is desired to support an undersea pipeline or the like at a uniform elevation, but if the seabed drops away from this desired elevation such that an extension is required to maintain the pipeline at its desired elevation or depth.

Referring now to FIG. 7, a single support post earth anchor/anode assembly is illustrated in its entirety by reference character 51, this single support post anchor/anode assembly being adapted to solidly support pipeline 3 without the necessity of providing a pair of earth anchor/anode assemblies 1 on opposite sides of the pipelines, as shown in FIG. 1. More specifically, the earth anchor/anode assembly 51 comprises a central longitudinal post 53 having one or more helix plates 55 and 57 affixed to its lower end adjacent tip 59 so as to facilitate the torsional insertion or screwing of post 53 into the seabed. These helix plates 55 and 57 may be essentially identical to plate 7 heretofore described. A so-called support platform 61 is provided on the upper end of post 53 with this support platform comprising a collar 63 adapted to receive the upper end of post 53. A molded-in-place anode body 65, of a suitable anode metal alloy, is provided on post 53 and is electrically connected top pipeline 3 by means of a lead wire 67 so as to ensure good electrical continuity between the pipeline 3 and the anode body. A pipeline strap 69 overlies pipeline 3 and is rigidly secured (e.g., bolted) to platform 61 so as to secure the pipeline relative to post 53.

Figure 8:
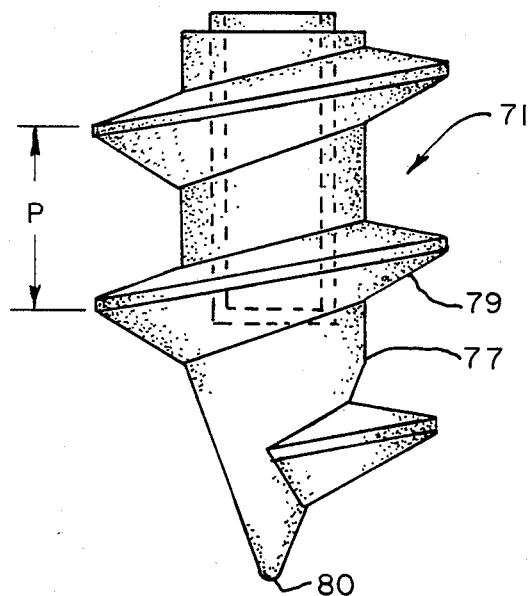
FIG. 8 is an elevational view, on an enlarged scale, of an alternative combination anode/threadably driven or rotary penetrating grounding point for use as an earth anchor/anode or as a torsionally installed anode.
Figure 9:
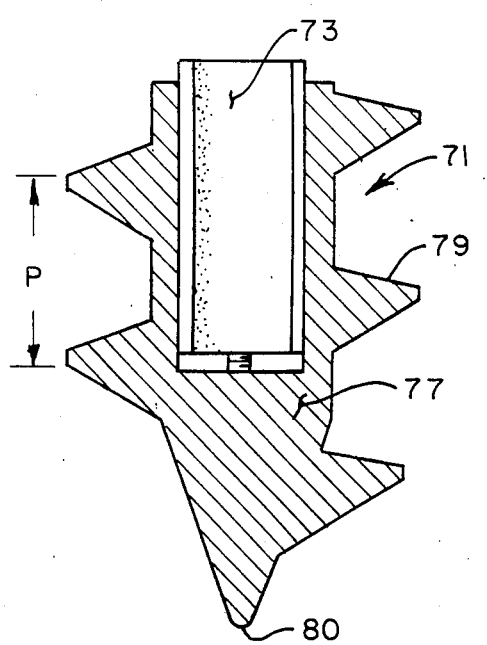
FIG. 9 is a vertical cross sectional view of FIG. 8.

As shown in FIGS. 8 and 9, in accordance with this invention, a combination anode and earth penetrating screw tip 71 may be utilized in conjunction with the earth anchor/anode assemblies heretofore described or in combination with conventional earth anchors (not shown) now widely used by the utility companies for aiding in the insertion of earth anchors and for providing galvanic corrosion protection to the earth anchor and to other metal structures that may be in electrical continuity with the combination anode/earth anchor tip 71. More specifically, the combination anode/earth anchor screw tip 71 is shown to comprise an inner socket 73 adapted to receive the lower end, for example, of a shaft of an earth anchor or the shaft 5 of a torsionally driven anode assembly of the present invention without helix plate 7 or tip 9 attached thereto. In other words, the upper end of supplemental anode assembly 31 illustrated in FIG. 5 may be inserted may be inserted in socket 73. Then, the torsional drive apparatus D may be readily interconnected to the universal earth anchor/anode assembly 31 and anode/screw tip 71 via socket 37 on shaft 33 to drive the latter into the earth. A tapped hole 73 is provided in the base of socket 73 for the attachment of a grounding wire or for the positive interlocking of the shaft (not shown) which is received in socket 73. Moreover, a cast-in-place anode body 77 is provided on the outer surface of socket structure 73 with this anode body being of a suitable galvanic anode metallic alloy (e.g., zinc, aluminum, or magnesium). The cast-in-place anode body 77 has helical earth penetrating threads 79 cast-in-place thereon, as well as an earth penetrating tip 80 so as to aid in the torsional driving of the tip into the earth. As best shown in FIG. 8, the axial spacing between the flights of the helical threads 79 has a pitch P such that on each revolution of the tip, the tip will threadably advance into the earth a distance substantially equal to pitch P.

Figure 15:
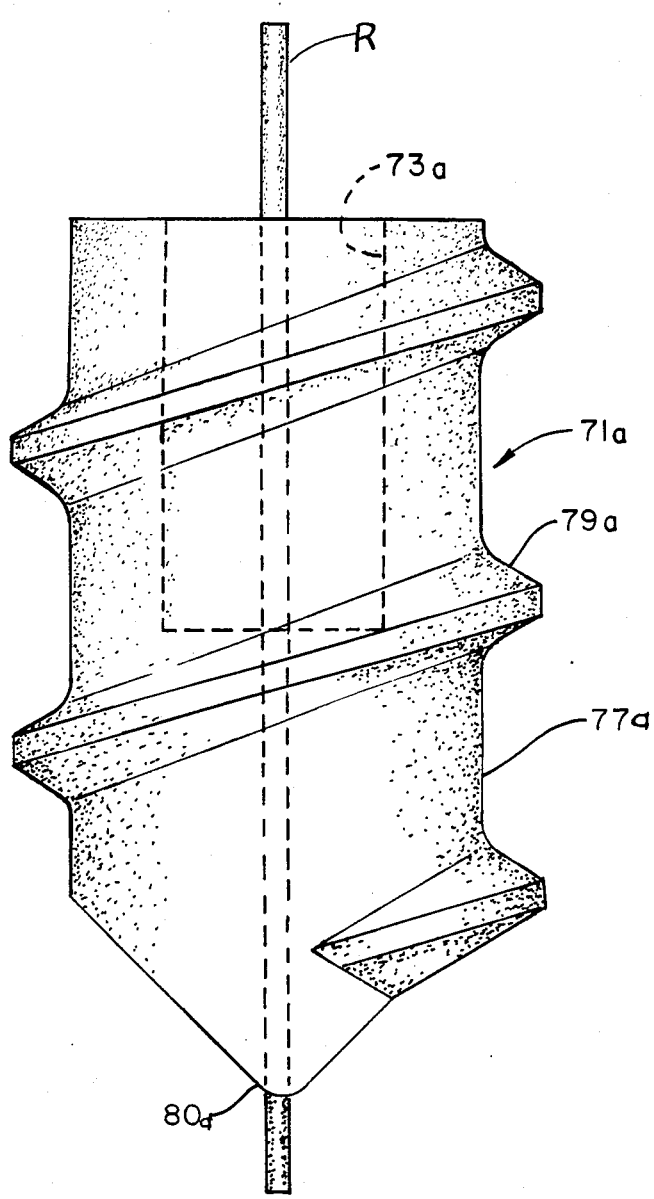
FIG. 15 is an elevational view of another embodimenty of a combination anode/threadably driven or rotary penetrating grounding point screw anode, similar to that shown in FIGS. 8 and 9.
Figure 16:
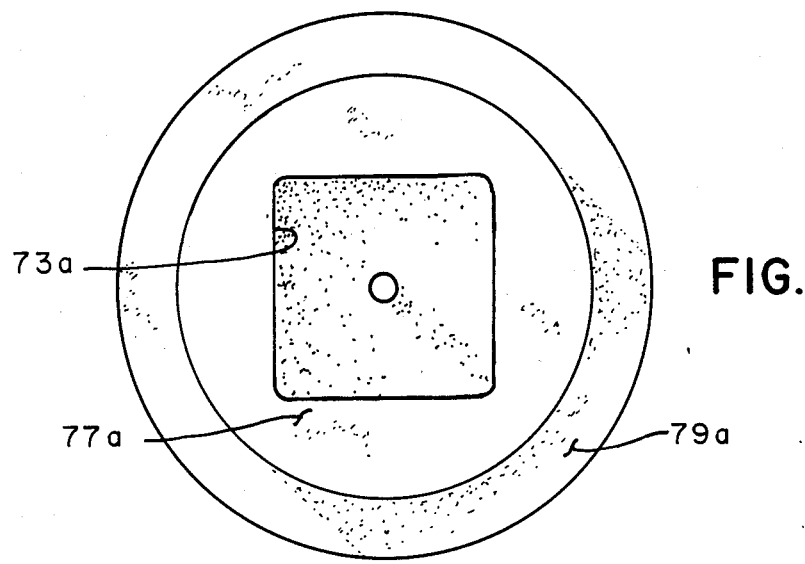
FIG. 16 is a top plan view of FIG. 15.

In FIGS. 15 and 16, another embodiment of the screw auger is illustrated and is indicated in its entirety by reference character 71a, with corresponding reference characters indicating parts having a corresponding function. However, earth penetrating screw 79a has a cast body of a suitable metal alloy, such as magnesium, aluminum, or zinc, and has an elongate center rod R extending coaxially therethrough for the electrical connection of a bonding wire (not shown).

Figure 10:
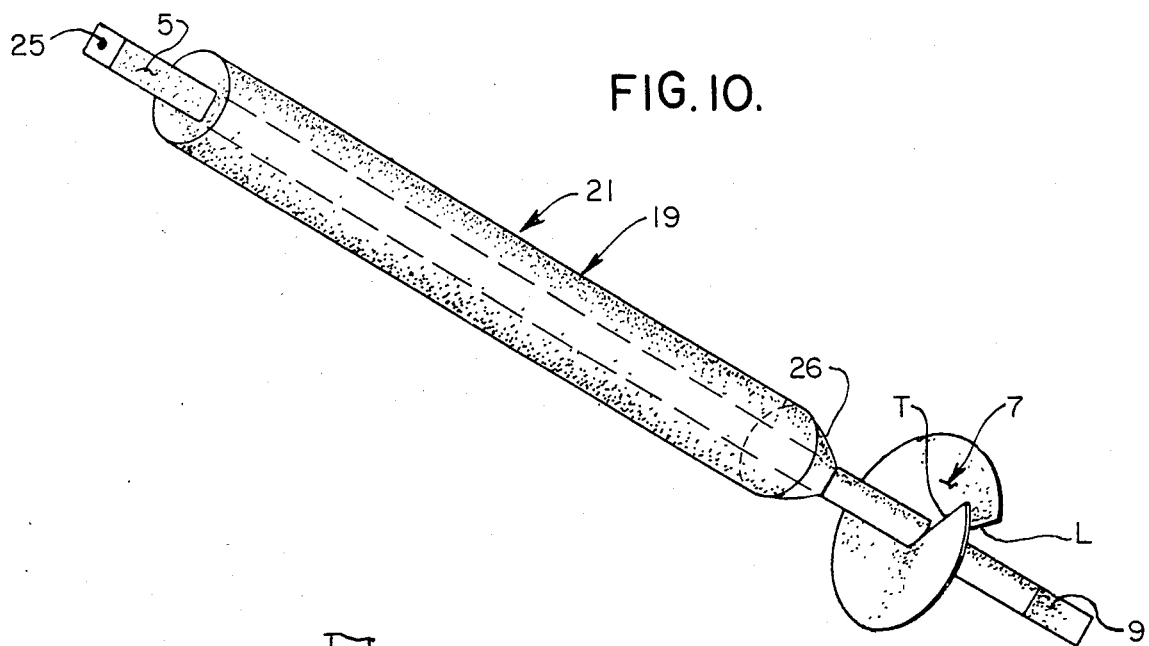
FIG. 10 is a perspective view of the torsionally driven anode, as shown in FIG. 2.

Referring now to FIGS. 11–14, a number of different onshore, underground uses of the torsional anodes 21, as shown in FIGS. 2 and 10, are illustrated. More specifically, in FIG. 11, a pipeline 3 is buried underground to a predetermined depth. Spaced laterally from pipeline 3', up to a maxium distance of about 20 feet, a plurality of torsionally installed anode assemblies 21 are torsionally driven downwardly into the ground to a depth equal to or preferably somewhat below the depth of pipeline 3'. Anodes 21 are torsionally driven by any conventional earth anchor driver D, such as a suitable hydraulic motor, in wide use by utility companies to drive conventional earth anchors. A suitable extension rod 43' has sockets 45 at each end thereof and may be used to interconnect the anode 21 to driver D. The extension may be removed after the anode 21 has been driven to its desired depth.

Figure 12:
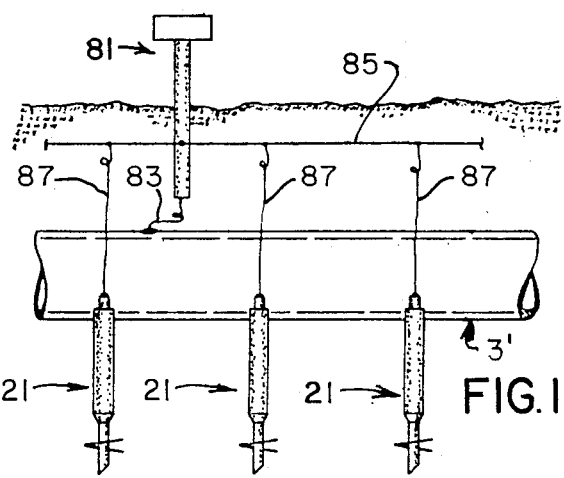
FIG. 12 is a side elevational view of a cathodic corrosion resistant protection system shown in FIG. 11.

As shown in FIG. 12, a plurality of the torsionally driven anode assemblies 21 are provided along the length of the pipeline with the depth and the spacing between the torsionally driven underground anodes 21 being determined by a number of factors, including the soil conditions, the type of coating utilized on the pipeline, underground water conditions, and the like. At predetermined locations along the length of the pipeline 3', so-called connection and test station enclosures 81 are provided with these enclosures being in electrical contact with the pipeline by means of a pipeline bond wire 83. The various torsionally installed anode assemblies 21 are electrically interconnected to the pipeline bond wire 83 by means of an anode bond wire 85 and respective anode leads 87.

Figure 13:
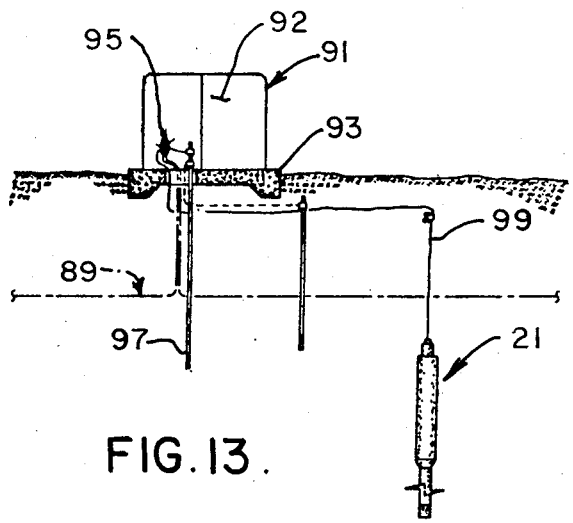
FIG. 13 is a view illustrating the use of torsionally installed anodes of the present inveniton so as to provide cathodic protection for grounding rods and other underground electrical disribution equipment.

In FIG. 13, a typical protection system for an underground electrical utility system, including buried conductors and ground wires, is illustrated. As is typical, the underground electrical conductors 89 are buried a suitable depth below grade, and a transformer 91 located above ground is enclosed by a suitable housing 92 or the like, resting on a precast concrete pad 93. Within transformer housing 92, an anode lead, ground bond, and conductor neutral splice is provided, as indicated at 95, so as to provide electrical continuity between the buried distribution conductors 89, ground rods 97, and the underground torsional anode assemblies 21 of the present invention. It will be appreciated that the underground torsional anode assemblies 21 are interconnected to the splice 95 by means of a suitable anode lead 99.

Figure 14:
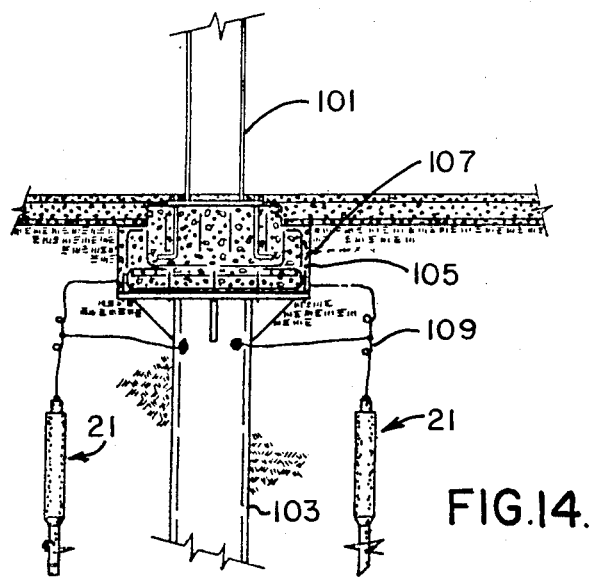

In FIG. 14, an underground corrosion protection system for structural pilings, concrete reinforcing steel, or other buried metal structure is illustrated. More specifically, in a foundation of a building or the like, the vertical columns 101 of the building are often supported by underground steel piers 103. At the upper end of piers 103, a concrete footing 105 may be provided having steel reinforcing rods 107 and the like therein. A vertical steel column 101 typically bears on footing 105 and is secured to the footing by means of suitable bolts and the like (not shown) with the vertical loads from the columns being transferred through the footing to piling member 103. To prevent galvanic corrosion of the piling members 103 and of the steel reinforcing members 107 in concrete footing 105, a plurality of underground torsionally installed anode assemblies 21 of the present invention may be utilized by interconnecting the anode assemblies 21 to the piling members 103 and to the steel reinforcing members 107 by means of suitable anode leads 109.

In use, underground anode assemblies 21 of the present invention may be readily driven to a desired depth below grade by inserting tip 9' in the ground and orienting the anode assembly so that shaft 5' extends generally vertically. Then, a suitable torsional drive apparatus D, such as a hydraulically powered motor used by electric utility repair crews to install conventional earth anchors, may be interconnected to the upper end of shaft 5', and the anode assembly 21 is rotatably driven in one direction (i.e., counterclockwise, as viewed from above) until it reaches its desired depth below grade.

As used in this specification, the term "earth anchor" is used in a generic sense to include any screw or other means for penetrating the earth, ground, or seabed for installation of the sacrificial anode assemblies or anode support assemblies, as shown herein.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A torsionally installed galvanic anode for corrosion protection of a metal structure located within an environment, comprising an elongate shaft having means on its bottom end forming screwing means for screwing said shaft into the ground upon rotation of said shaft, an anode body carried by said shaft securely fastened concentrically onto the exterior surface of said shaft for exposure to the surrounding environment in which the anode locates, said shaft having substantial length and being capable of withstanding significant torsional forces exerted through said shaft during embedding of said galvanic anode into the ground, the lower end of said anode body comprising at least one helix and being contoured into an earth penetrating shape to form said screwing means said concentrially arranged anode body and its contoured lower end being formed of at least one of an aluminum, zinc, magnesium, and an alloy thereof, and means on said shaft cooperable with a rotatable drive means for rotating said shaft and for torsionally installing at least in part said anode into the ground and for providing surface contact of at least a part of said anode with the same.

2. The torsionally installed anode as set forth in claim 1, wherein said screwing means, formed of the said anode body,has a tip on the bottom end thereof below the helix formed threads.

3. The anode of claim 2 wherein said helix of the anode body, has a leading edge and a trailing edge, with the leading edge being spaced closer to the bottom end of the said anode than the trailing edge.

4. A torsionally installed anode as set forth in claim 1 serving to support a metal structure under water above the bed of the sea, said shaft with said anode body formed screwing means thereon being threadedly driven into the sea bed with at least a portion thereof extending up above said sea bed for supporting said metal structure above the sea bed, said anode body also being carried by said portion of said shaft extending up above the sea bed.

5. A torsionally installed anode as set forth in claim 4 and further including means above said anode body for supporting said metal structure.

6. A torsionally installed anode as set forth in claim 5 wherein said metal structure is an underwater pipline, and wherein, at specified locations along said pipe line, pairs of said torsionally installed anodes are installed in said sea bed with one of said torsionally installed anodes being on one side of said pipeline and with another of said torsionally installed anodes being on the other side of said pipeline, said support means comprising a bracket spanning between said pair of torsionally installed anodes.

7. A torsionally installed anode as set forth in claim 6 wherein said screwing means on one of said anodes of said pairs is in one direction and said screwing means on the other of said anodes of said pairs is in the other direction.

8. A torsionally upper end of said shaft of each of said torsionally installed anodes has means engagable by torsional drive means for screwing said torsionally installed anode into sea bed.

9. A torsionally installed anode as set forth in claim 4 wherein said anode body is in electrical contact with said metal underwater structure.

10. A torsionally installed anode as set forth in claim 1 wherein an elongate rod of electrically conductive material runs through the anode for the electrical connection thereof to a metal structure.

* * * * *

UNITED STATES PATENT AND TRADEMARK OFFICE
CERTIFICATE OF CORRECTION

PATENT NO. : 4,626,330

DATED : Dec. 2, 1986

INVENTOR(S) : Marion R. Farmer

It is certified that error appears in the above—identified patent and that said Letters Patent is hereby corrected as shown below:

```
    Please make the following change:
    Claim 8, line 1, insert after torsionally,
---installed anode as set forth in claim 5, wherein the---.
```

Signed and Sealed this

Fifteenth Day of September, 1987

Attest:

DONALD J. QUIGG

*Attesting Officer*　　　*Commissioner of Patents and Trademarks*